_(12)_ United States Patent
Cramb et al.

(10) Patent No.: US 9,366,190 B2
(45) Date of Patent: Jun. 14, 2016

(54) TAPERED GAS TURBINE ENGINE LIQUID GALLERY

(71) Applicant: Solar Turbines Incorporated, San Diego, CA (US)

(72) Inventors: Donald James Cramb, San Diego, CA (US); James Scott Piper, Bonita, CA (US); Sean Kelly Spivey, La Mesa, CA (US); Michael John Ramotowski, San Diego, CA (US); Matthew Mayer, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 401 days.

(21) Appl. No.: 13/893,019

(22) Filed: May 13, 2013

(65) Prior Publication Data

US 2014/0331676 A1   Nov. 13, 2014

(51) Int. Cl.
*F23R 3/14* (2006.01)
*F02C 7/232* (2006.01)
*F23R 3/28* (2006.01)
*F23D 11/40* (2006.01)

(52) U.S. Cl.
CPC .............. *F02C 7/232* (2013.01); *F23D 11/402* (2013.01); *F23R 3/14* (2013.01); *F23R 3/286* (2013.01); *F23D 2900/14641* (2013.01); *F23R 2900/00019* (2013.01); *Y10T 29/49229* (2015.01)

(58) Field of Classification Search
CPC ............ F02C 7/222; F02C 7/22; F02C 7/232; F02C 9/26; F23D 11/402; F23D 2900/14641; F23R 3/14; F23R 3/286; F23R 2900/00019; Y10T 29/49229
See application file for complete search history.

(56) References Cited

U.S. PATENT DOCUMENTS

| 2,955,537 | A | | 10/1960 | Gaubatz | |
|---|---|---|---|---|---|
| 3,949,775 | A | * | 4/1976 | Cornell | F02C 7/222 137/118.02 |
| 4,010,767 | A | * | 3/1977 | Cornell | F02C 7/222 137/118.02 |
| 4,036,246 | A | * | 7/1977 | Cornell | F02C 7/222 137/118.02 |
| 4,862,693 | A | * | 9/1989 | Batakis | F23D 23/00 239/145 |
| 4,918,925 | A | * | 4/1990 | Tingle | F02C 7/228 60/739 |
| 5,101,634 | A | * | 4/1992 | Batakis | F23R 3/28 60/737 |
| 5,119,636 | A | * | 6/1992 | Batakis | F23R 3/283 60/739 |
| 6,141,954 | A | | 11/2000 | Sowa et al. | |
| 6,178,752 | B1 | | 1/2001 | Morford | |
| 6,711,898 | B2 | * | 3/2004 | Laing | F23R 3/34 60/739 |
| 7,581,402 | B2 | | 9/2009 | Parker | |
| 8,186,162 | B2 | | 5/2012 | Rogers et al. | |
| 2006/0029895 | A1 | | 2/2006 | Vatsky | |
| 2011/0005231 | A1 | | 1/2011 | Low | |
| 2012/0145273 | A1 | * | 6/2012 | Pelletier | F02C 7/222 138/111 |
| 2012/0324896 | A1 | | 12/2012 | Kim et al. | |

FOREIGN PATENT DOCUMENTS

GB   751451   6/1956

* cited by examiner

*Primary Examiner* — Carlos A Rivera
(74) *Attorney, Agent, or Firm* — Procopio, Cory, Hargreaves & Savitch LLP

(57) ABSTRACT

A liquid gallery for a fuel injector of a gas turbine engine includes a gallery body, a liquid gallery scroll, a plurality of atomizer inlets, and a plurality of atomizer bosses. The liquid gallery scroll extends into the gallery body spanning from a first end to a second end in a circumferential direction. The liquid gallery scroll includes a taper with a cross-sectional area of the liquid gallery scroll reducing from the first end to the second end. Each atomizer inlet is in flow communication with the liquid gallery scroll. Each atomizer boss is aligned with one of the plurality of atomizer inlets.

14 Claims, 7 Drawing Sheets

US 9,366,190 B2

TAPERED GAS TURBINE ENGINE LIQUID GALLERY

TECHNICAL FIELD

The present disclosure generally pertains to gas turbine engines, and is more particularly directed toward a fuel injector with a tapered liquid gallery.

BACKGROUND

Gas turbine engines include compressor, combustor, and turbine sections. Fuel for gas turbine engines may coke within the fuel injector, including the liquid gallery, when heated above certain temperatures.

U.S. Pat. No. 6,141,954 to W. Sowa discloses a premixing fuel injector for an industrial gas turbine engine. The premixing fuel injector includes an axially extending centerbody and a pair of radially offset scrolls bounding a mixing chamber. The leading end of each scroll cooperates with the trailing end of the neighboring scroll to define an intake slot for admitting a stream of primary combustion air tangentially into the mixing chamber. Fuel injection passages extend along each intake slot for injecting jets of primary fuel into the incoming airstream.

The present disclosure is directed toward overcoming one or more of the problems discovered by the inventors.

SUMMARY OF THE DISCLOSURE

A liquid gallery for a fuel injector of a gas turbine engine is disclosed. The liquid gallery includes a gallery body, a liquid gallery scroll, a plurality of atomizer inlets, and a plurality of atomizer bosses. The liquid gallery scroll extends into the gallery body spanning from a first end to a second end in a circumferential direction. The liquid gallery scroll includes a taper with a cross-sectional area of the liquid gallery scroll reducing from the first end to the second end. Each atomizer inlet is in flow communication with the liquid gallery scroll. Each atomizer boss is aligned with one of the plurality of atomizer inlets.

A method for overhauling a gas turbine engine injector is also disclosed. The method includes removing an outer premix barrel from the injector. The method also includes removing an inner premix tube from the injector. Removing the inner premix tube includes removing a retaining ring configured to secure inner premix tube to an injector body of the injector. The method further includes removing a liquid gallery assembly from the injector. Removing the liquid gallery includes machining out portions of the liquid gallery joined to the injector body. The method also includes joining a new liquid gallery assembly to the injector body.

DETAILED DESCRIPTION

The systems and methods disclosed herein include a gas turbine engine injector including a liquid gallery. In embodiments, the liquid gallery is an annular ring or hollow cylinder with a liquid gallery scroll extending into the annular ring or hollow cylinder, the liquid gallery scroll being an annular channel. The liquid gallery scroll is tapered and sized to maintain a velocity of the liquid fuel through the liquid gallery scroll above a predetermined value. In some embodiments, the liquid gallery scroll is configured to maintain the fuel flow within turbulent flow ranges during operation of the gas turbine engine. Maintaining a higher velocity in the fuel may reduce residence time within the liquid gallery and may reduce the heat transferred to the fuel, reducing the temperature of the fuel during operation of the gas turbine engine. Reducing the temperature of the fuel may reduce or prevent fuel coking.

Figure 1:
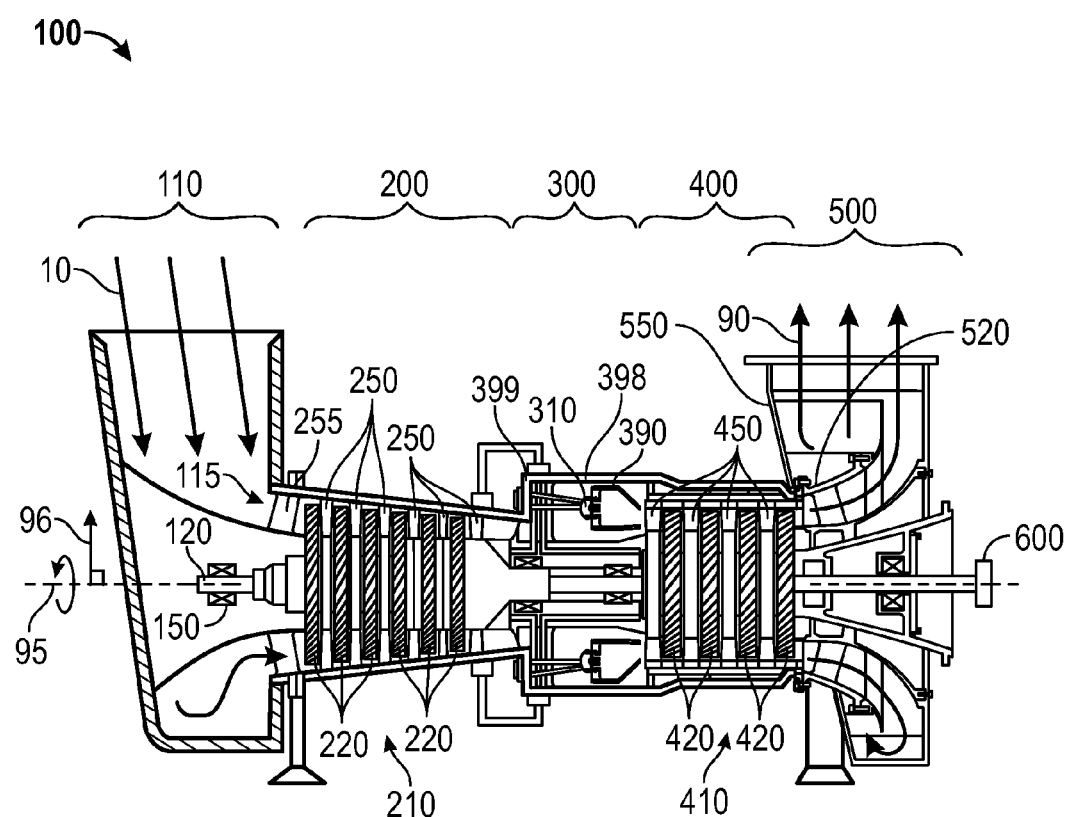
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or "compressor" 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more injectors 310 and includes one or more combustion chambers 390. Each injector 310 includes an injector head 320 (shown in FIGS. 2 and 3), which includes a liquid gallery assembly 340 (shown in FIGS. 3 and 4). In the gas turbine engine shown, each injector 310 is installed into combustor 300 in the axial direction relative to center axis 95 through radial case portion 399 of combustor case 398 or the compressor diffuser case.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 520 and an exhaust collector 550.

Figure 2:
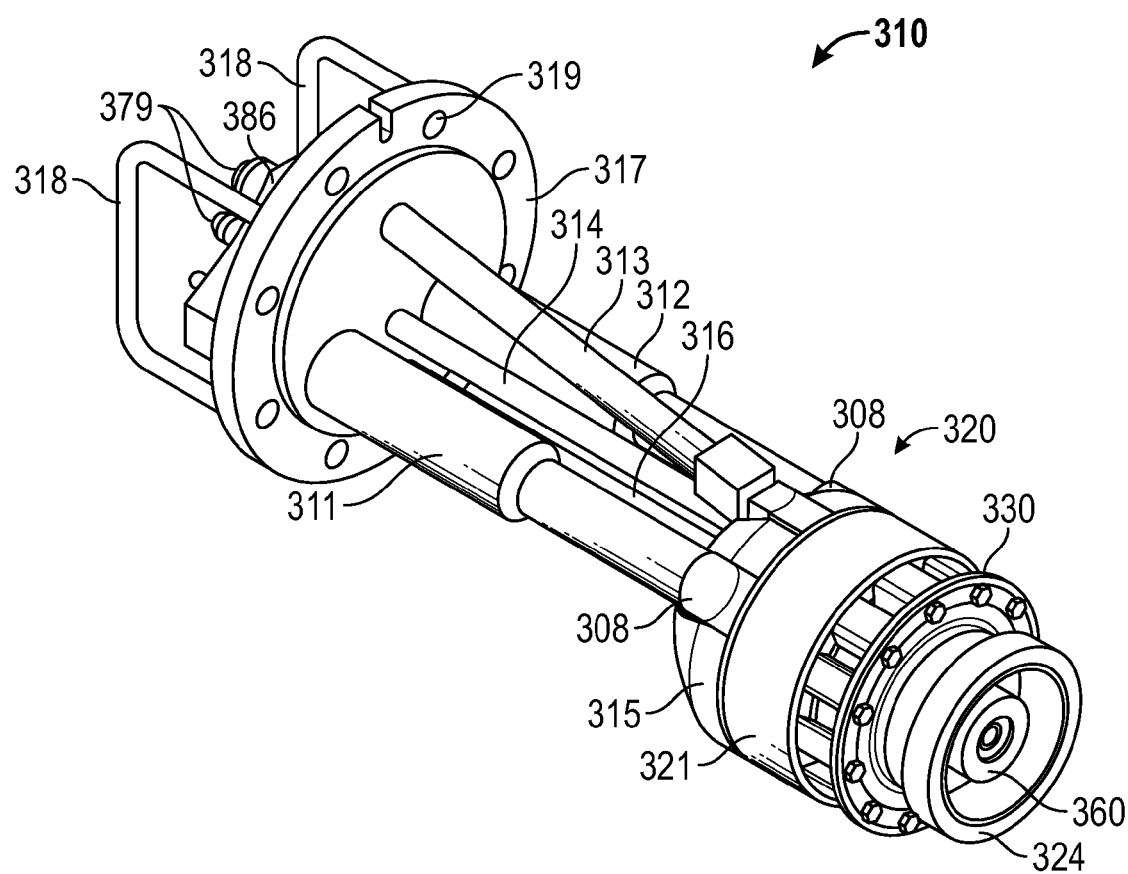
FIG. 2 is a perspective view of the fuel injector of FIG. 1.

FIG. 2 is a perspective view of injector 310 of FIG. 1. Injector 310 may include a flange 317, an injector head 320, a first main gas tube 311, a second main gas tube 312, a support tube 313, a liquid inlet tube stem 314, a liquid inlet tube 354 (shown in FIG. 3), a pilot stem 316, and a liquid pilot tube assembly 370 (shown in FIG. 3). Flange 317 may be a cylindrical disk. Flange 317 includes flange bolt holes 319 for securing injector 310 to gas turbine engine 100 at radial case portion 399 (shown in FIG. 1). Flange 317 may also include handles 318. Fittings 379 such as gas main and liquid main connector assemblies may attach to divider blocks, such as main gas divider block 386, attached to an outer or base surface of flange 317. Liquid and gas fuel sources may be attached to fittings 379.

Figure 3:
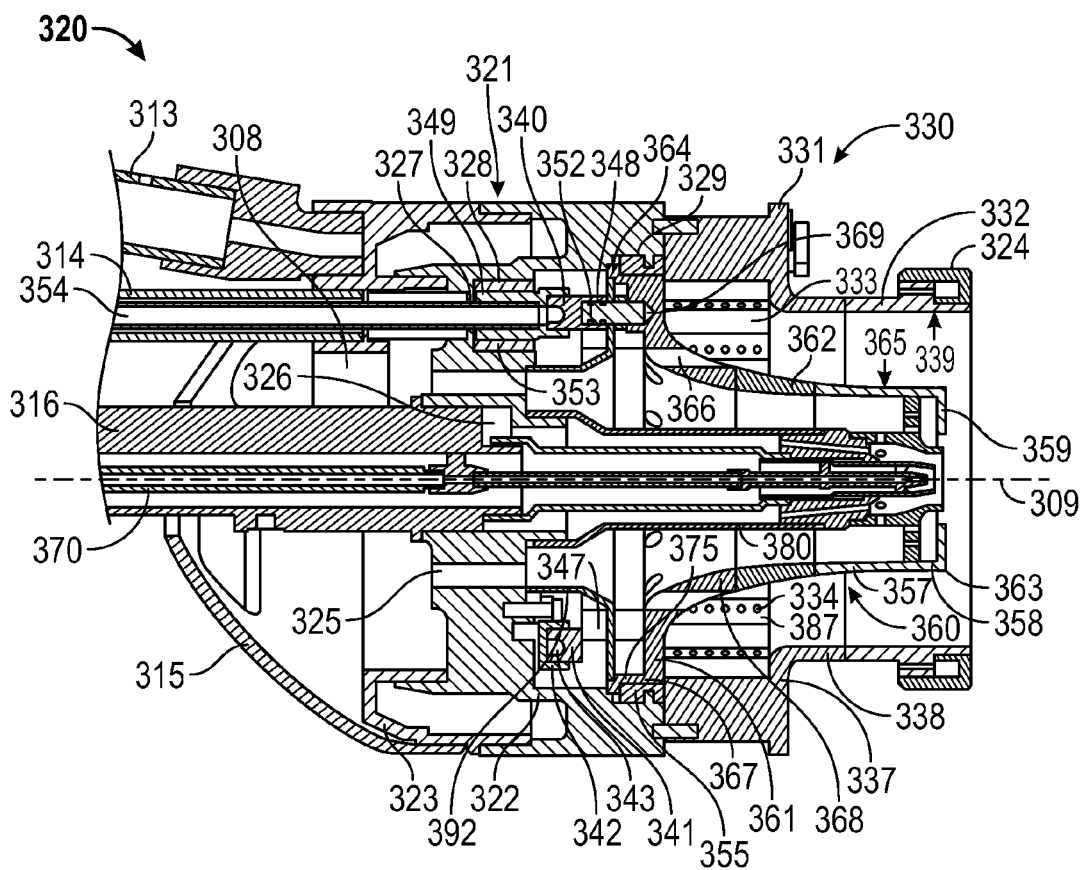
FIG. 3 is a cross-sectional view of the injector head of FIG. 2.

Injector head 320 may include an assembly axis 309 (shown in FIG. 3). All references to radial, axial, and circumferential directions and measures of injector head 320 and the elements of injector head 320 refer to assembly axis 309, and terms such as "inner" and "outer" generally indicate a lesser or greater radial distance from assembly axis 309. The center of flange 317 may be offset from assembly axis 309.

FIG. 3 is a cross-sectional view of the injector head 320 of FIG. 2. Referring to FIGS. 2 and 3, injector head 320 may include body assembly 321, outer cap 315, outer premix barrel 330, inner premix tube 360, premix barrel cap 324, liquid gallery assembly 340, flow shield 392, retaining ring 355, liquid pilot tube assembly 370, and pilot shroud 380. Body assembly 321 may include injector body 322 and gas main shroud 323. Injector body 322 may have a disk or cylindrical shaped base with a coaxial hollow cylinder portion extending in the aft direction from the base. The diameter of the hollow cylinder portion may be larger than the diameter of the base.

Referring to FIG. 3, injector body 322 may include liquid pilot opening 326, feed air passages 325, liquid main opening 327, collar counterbore 328, and retaining ring recess 329. Liquid pilot opening 326 may be coaxial to injector body 322 and may extend through the base of injector body 322 in the axial direction. Feed air passages 325 may also extend through the base of injector body 322 in the axial direction. Feed air passages 325 may be located radially outward from assembly axis 309 and liquid pilot opening 326, and may be located radially inward from an inner surface of the hollow cylinder portion of injector body 322. In embodiments, injector body 322 includes four feed air passages 325.

Liquid main opening 327 may be located radially outward from assembly axis 309 and feed air passages 325, and may be located radially inward from the inner surface of the hollow cylinder portion of injector body 322. Collar counterbore 328 is coaxial to liquid main opening 327 and extends in the forward direction partially into the base of injector body 322 from the aft side of the base.

Retaining ring recess 329 is an annular recess may be located at the aft end of the hollow cylinder portion of injector body 322. Retaining ring recess 329 may be threaded or may include a lip or an annular protrusion configured to hold retaining ring 355 in place.

Referring again to FIGS. 2 and 3, gas main shroud 323 may have a hollow cylinder shape and may have a 'C', 'U', or 'J' shaped cross-section revolved about injector assembly axis 309. Gas main shroud 323 may include fuel transfer bosses 308. Fuel transfer bosses 308 may be thickened portions or boss structures extending from a radially inner portion of the hollow cylinder shape of gas main shroud 323. Fuel transfer bosses 308 may be formed to include fuel transfer passages. One end of the 'C', 'U', or 'J' shape may attach to the hollow cylinder portion of injector body 322 at or near a radially outermost portion of the hollow cylinder portion of injector body 322, while the other end of the 'C', 'U', or 'J' shape may attach to the base of injector body 322 at or near a radially outermost portion of the base. The connection of the 'U' or 'J' shape of gas main shroud 323 to injector body 322 may form an annular chamber between gas main shroud 323 and injector body 322. Injector body 322 and gas main shroud 323 may be brazed or welded together.

Outer cap 315 may be a dome shaped cap that attaches to the body assembly 321 at the radially outer surface of gas main shroud 323. Outer cap 315 may include multiple holes and passageways.

Referring again to FIG. 2, first main gas tube 311 and second main gas tube 312 may extend from the gas main connector assembly (not shown) and flange 317 in the axial direction to fuel transfer bosses 308 (shown in FIG. 3). First main gas tube 311 and second main gas tube 312 may be in flow communication with main gas shroud and the flow transfer holes.

Support tube 313 may connect to flange 317 and gas main shroud 323 of body assembly 321. Support tube 313 may extend axially and radially inward from flange 317 to body assembly 321 relative to injector assembly axis 309.

Liquid inlet tube stem 314 and pilot stem 316 may each extend from flange 317 to injector head 320 in the axial direction. Liquid inlet tube stem 314 may be a circular tube and may attach to gas main shroud 323. Liquid inlet tube stem 314 may attach to gas main shroud 323 near or adjacent to where support tube 313 connects to gas main shroud 323. Pilot stem 316 may attach to and may be partially inserted into liquid pilot opening 326 of injector body 322. Liquid inlet tube stem 314 may be welded or brazed to gas main shroud 323, and pilot stem 316 may be welded or brazed to injector body 322.

Liquid inlet tube 354 may extend axially through liquid inlet tube stem 314 from the liquid main connector and flange 317 to injector body 322 and through liquid main opening 327 of injector body 322.

Figure 4:
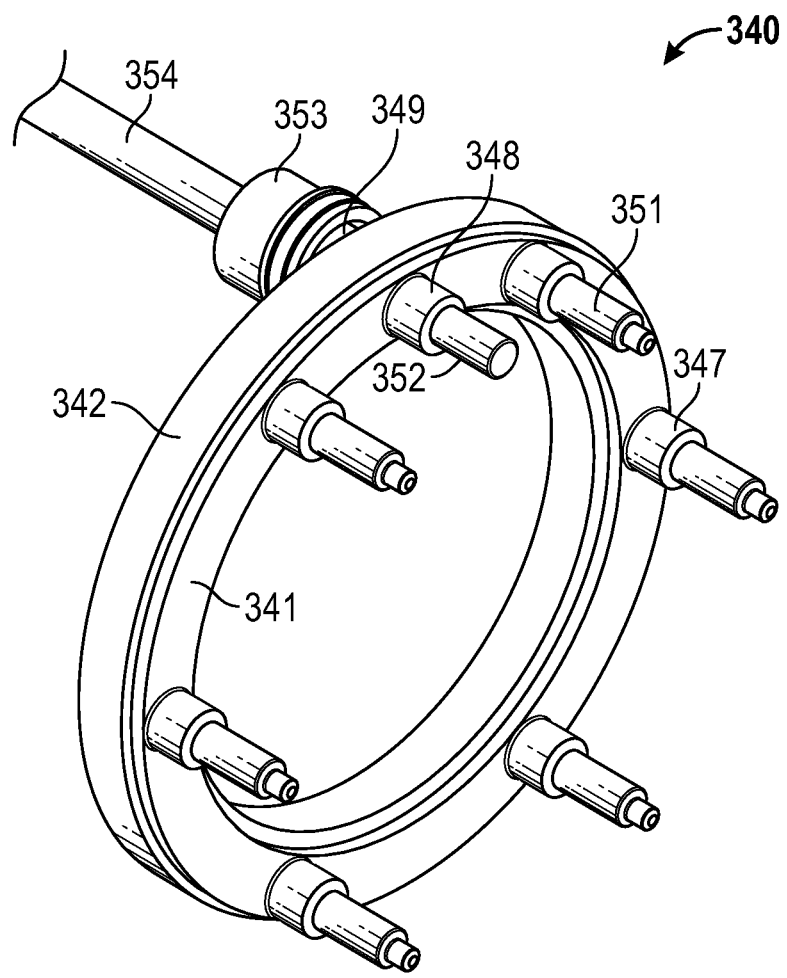
FIG. 4 is a perspective view of the liquid gallery assembly of FIG. 3.

FIG. 4 is a perspective view of the liquid gallery assembly of FIG. 3. Referring to FIGS. 3 and 4, liquid gallery assembly 340 may include collar 353, gallery cover 342, liquid gallery 341, atomizers 351, and clocking pin 352. Liquid inlet tube 354 may connect to gallery cover 342. Collar 353 may be located adjacent gallery cover 342 around the end of liquid inlet tube 354 that attaches or connects to gallery cover 342. Collar 353 may also be located within collar counterbore 328.

Figure 5:
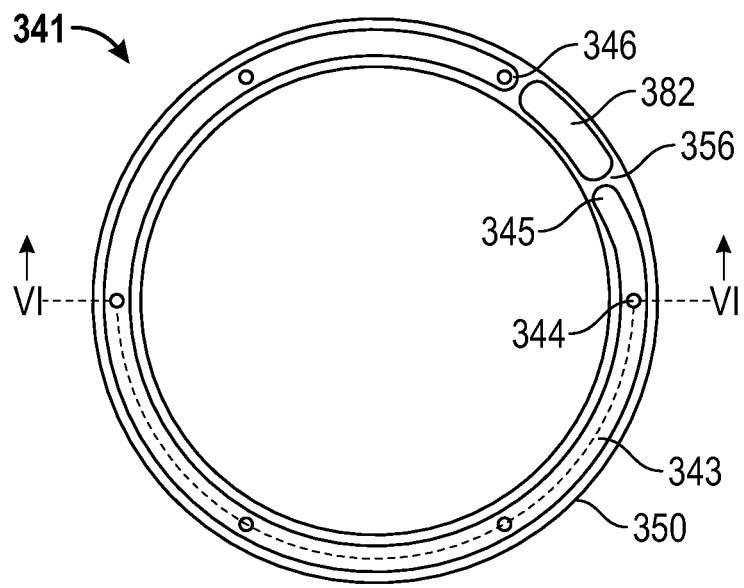
FIG. 5 is a plan view of the liquid gallery of FIG. 4.

FIG. 5 is a plan view of the liquid gallery 341 of FIG. 4. Referring to FIGS. 4 and 5, liquid gallery 341 includes gallery body 350 and liquid gallery scroll 343. Liquid gallery 341 may also include mating surface 356, atomizer inlets 344, atomizer bosses 347, and clocking pin boss 348. Gallery body 350 may be an annular ring or hollow cylinder coaxial to liquid gallery assembly 340 and injector assembly axis 309. Referring to FIG. 5, mating surface 356 may be the forward surface of gallery body 350. Mating surface 356 may face in the axial direction. Liquid gallery 341 is formed to include liquid gallery scroll 343, an annular channel spanning from a first end 345 to a second end 346 about mating surface 356 and extending into gallery body 350. In one embodiment, liquid gallery scroll 343 spans ninety-three percent of the circumference of gallery body 350. In another embodiment, liquid gallery scroll 343 spans between ninety to ninety-five percent of the circumference of gallery body 350.

Figure 6:
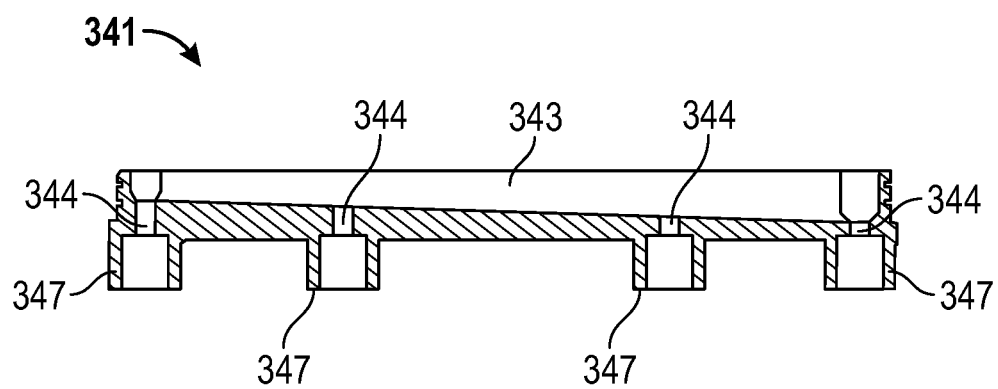
FIG. 6 is a cross-sectional view of the liquid gallery of FIG. 5.

FIG. 6 is a cross-sectional view of the liquid gallery 341 of FIG. 5. In the embodiment illustrated in FIGS. 5 and 6, liquid gallery scroll 343 tapers from first end 345 to second end 346 with the cross-sectional area of liquid gallery scroll 343 reducing from first end 345 to second end 346. Liquid gallery scroll 343 includes a constant taper from first end 345 to second end 346. In other embodiments, liquid gallery scroll 343 may include tapered sections and sections with a constant cross-sectional area. The amount of taper may also change as the cross-sectional area of liquid gallery scroll 343 gets smaller.

The cross-section of liquid gallery scroll 343 may be subdivided into a depth and a width. The depth being the axial height that liquid gallery scroll 343 extends into gallery body 350, and the width being the radial length that liquid gallery scroll 343 spans across gallery body 350. In the embodiment illustrated, the depth of liquid gallery scroll decreases from the first end 345 to the second end 346, which reduces the cross-sectional area of liquid gallery scroll 343 to form the taper. In other embodiments, the width of liquid gallery scroll 343 reduces from first end 345 to second end 346 to form the taper. In yet other embodiments, both the depth and the width of liquid gallery scroll 343 reduce from the first end 345 to the second end 346 to form the taper.

In the embodiment illustrated in FIG. 6, the cross-section of liquid gallery scroll 343 is an extended half round or rectangle with a semicircle at the end. Other cross-sectional shapes such as rectangles, squares, and circles may also be used. The edges of the rectangle and square cross-sections may be rounded.

Referring again to FIG. 4, six atomizer bosses 347 extend from the radial surface of gallery body 350 opposite mating surface 356 in the axially aft direction, the direction opposite mating surface 356, in the embodiment illustrated. Each atomizer boss 347 may be sized to hold one atomizer 351. Each atomizer boss 347 may have a hollow cylinder shape with a diameter smaller than the radial thickness of gallery body 350. Atomizer bosses 347 may be equally spaced about liquid gallery 341 with sixty degrees between adjacent atomizer bosses 347. In other embodiments, a different number of atomizer bosses 347 may be used. Different shapes, sizes, and spacing may also be used.

In the embodiment illustrated, a clocking pin boss 348 extends from the radial surface opposite mating surface 356 in the axially aft direction between two atomizer bosses 347. Clocking pin boss 348 may be shaped similarly to atomizer bosses 347 and may be sized to hold clocking pin 352. Clocking pin 352 may have a cylindrical shape. Clocking pin 352 may help align inner premix tube 360 within injector head 320.

Referring to FIGS. 4-6, atomizer inlets 344 may extend axially from liquid gallery scroll 343 through the hollow cylinder shape of liquid gallery 341. Each atomizer inlet 344 may align with an atomizer boss 347. Each atomizer inlet 344 is in flow communication with liquid gallery scroll 343 and with an atomizer 351. As the depth of liquid gallery scroll 343 reduces from first end 345 to second end 346, the corresponding length of atomizer inlets 344 may be longer.

In the embodiment shown, liquid gallery 341 includes six atomizer inlets 344 equally spaced about liquid gallery 341 with sixty degrees between adjacent atomizer inlets 344. In other embodiments, a different number of atomizers 351 may be used. Different shapes, sizes, and spacing may also be used. Each atomizer 351 is installed within an atomizer boss 347 and may be welded or brazed to the atomizer boss 347.

Referring to FIG. 5, liquid gallery 341 may include heat transfer reduction slot 382. In the embodiment shown in FIG. 5, heat transfer reduction slot 382 spans circumferentially about a portion of gallery body 350 that does not include liquid gallery scroll 343. Heat transfer reduction slot 382 may start adjacent second end 346 and may end adjacent first end 345.

Referring to FIG. 3, gallery cover 342 may be an annular ring or hollow cylinder with a 'C' or 'U' shaped cross-section revolved around the axis of liquid gallery assembly 340, which is coaxial to injector assembly axis 309. Gallery cover 342 may include liquid inlet tube boss 349 extending axially forward from the annular ring or hollow cylinder shape of gallery cover 342. Liquid inlet tube 354 may extend into liquid inlet tube boss 349. Collar 353 may be located radially around liquid inlet tube boss 349.

Gallery cover 342 may be sized to fit over the outer and inner circumferential surfaces of liquid gallery 341. Mating surface 356 may contact an internal surface of gallery cover 342 and may form a seal with gallery cover 342. Gallery cover 342 may be brazed or welded to liquid gallery 341 at the outer and inner circumferential surfaces of liquid gallery 341.

Referring to FIG. 3, flow shield 392 may include an axial portion located radially inward from liquid gallery 341 and a radial portion extending from the axial portion located axially between liquid gallery 341 and inner premix tube 360.

Inner premix tube 360 may include transition end 361, middle tube 362, tip end 363, and premix tube inner surface 365. In the embodiment illustrated in FIG. 3, transition end 361 is a hyperbolic funnel that includes an annular disk portion 367 and a redirection portion 368 that curves toward the axially aft direction from the annular disk portion 367. In other embodiments, redirection portion may be formed from various cross-sectional shapes revolved about the axis of inner premix tube 360 that extend radially inward and axially from the annular disk portion 367 to begin the transition from a radial direction to an axial direction.

Transition end 361 may include outer cylindrical portion 375, retaining lip 364, clocking hole 369, and wipe passages 366. Outer cylindrical portion 375 may extend axially forward from the radially outer part of annular disk portion 367 in the direction opposite tip end 363. Outer cylindrical portion 375 may have a right hollow circular cylinder shape. Retaining lip 364 may extend radially outward from outer cylindrical portion. In the embodiment illustrated, retaining lip 364 also extends axially forward. Clocking hole 369 is sized to receive clocking pin 352 and aligns with clocking pin 352 when assembled. Transition end 361 may include a thickened or boss portion around clocking hole 369.

Transition end 361 is configured to include wipe passages 366. Wipe passages 366 may extend through redirection portion 368. Wipe passages 366 are configured to direct air along premix tube inner surface 365. In the embodiment shown, transition end 361 includes 12 wipe passages 366 equally spaced thirty degrees apart about transition end 361 extending axially through transition end 361. In other embodiments, a different number of wipe passages 366 may be used. Wipe passages 366 are sized and configured so that there is no or a minimal pressure drop across the wipe passage 366. Different shapes, sizing, spacing, and configurations may also be used.

Middle tube 362 may be welded or brazed to the aft end of transition end 361. In the embodiment shown in FIG. 3, middle tube 362 continues the hyperbolic funnel shape of transition end 361. In other embodiments, middle tube 362 may be a conical frustum, a funnel, or formed from a cross-section with curved outer and inner surfaces revolved about the axis of inner premix tube 360.

Tip end 363 may be welded or brazed to the aft end of middle tube 362. In the embodiment shown in FIG. 3, tip end 363 includes a curved portion 357, a cylindrical portion 358, and a tip face 359. Curved portion 357 may continue the hyperbolic funnel shape of transition end 361 and middle tube 362 and transitions from the curve of middle tube to a hollow right circular cylinder. Cylindrical portion 358 may be a hollow right circular cylinder extending aft from curved portion 357. Tip face 359 extends radially inward from the aft end of cylindrical portion 358 and may form an annular disk, the aft end being the axial end of cylindrical portion 358 distal to transition end 361.

Premix tube inner surface 365 is at least a portion of the outer surface of inner premix tube 360. Premix tube inner surface 365 is a revolved surface about the axis of inner premix tube 360 that transitions from a radial or an annular ring surface to a circumferential or cylindrical surface. In the embodiment illustrated, premix tube inner surface 365 is a hyperbolic funnel or a segment of a pseudosphere. In other embodiments, the radial surface may transition to a cylindrical surface with a combination of line segments or curves revolved about the axis of inner premix tube 360.

In the embodiment illustrated in FIG. 3, retaining ring 355 is an annular ring. Retaining ring 355 is sized to be installed within retaining ring recess 329. In the embodiment shown, retaining ring 355 and retaining ring recess 329 are threaded to secure retaining ring 355 to injector body 322. Other retaining or locking mechanisms may be used to secure retaining ring 355 to injector body 322. Retaining ring 355 is configured to secure, retain, or lock inner premix tube 360 within injector head 320. In the embodiment shown, retaining ring 355 is axially aft and radially aligned with retaining lip 364, securing inner premix tube 360 to injector body 322.

Liquid pilot tube assembly 370 may extend axially through pilot stem 316 from the pilot connector and through injector head 320. Liquid pilot tube assembly 370 may be coaxial to injector assembly axis 309. Pilot shroud 380 may be located radially outward from a portion of liquid pilot tube assembly 370 and located radially inward from inner premix tube 360. Pilot shroud 380 may extend aft from injector body 322.

Outer premix barrel 330 may include barrel 331, barrel end 332, and premix tube outer surface 339. Barrel 331 may include body portion 337, barrel portion 338, and vanes 333. Body portion 337 may have an annular disk shape. Barrel portion 338 may extend axially aft from body portion 337. In the embodiment shown in FIG. 3, barrel portion 338 extends from the aft and radially inner portion of body portion 337. Barrel portion 338 may have a hollow cylinder or cylindrical tube shape. The hollow cylinder or cylindrical tube shape may be tapered. The tapered cylinder may be the frustum of a hollow cone. The hollow cylinder or cylindrical tube shape may be tapered. The tapered cylinder may be the frustum of a hollow cone. Vanes 333 may extend axially forward from body portion 337. In the embodiment illustrated in FIG. 3, vanes 333 are wedge shaped with the tip of the wedge truncated or removed. Vanes 333 may include other shapes configured to direct and swirl air into the premix tube. Each vane 333 may include inward surface 387 and vent passages 334. Inward surface 387 is the surface at the end of vane 333 and is the radially inner surface of vane 333. Inward surface 387 may be a circumferential surface. Vent passages 334 may extend through each vane 333 and exit vane 333 at inward surface 387.

Barrel end 332 may be joined to barrel 331 at the aft end of barrel portion 338 with a metal joining process such as welding or brazing. Barrel end 332 may have a hollow cylinder or cylindrical tube shape similar to the shape of barrel portion 338. Premix barrel cap 324 may be welded or brazed to the aft end of barrel end 332 at the outer surface of barrel end 332. Premix barrel cap 324 may have a 'C', 'U', or 'J' shaped cross-section that is revolved about injector assembly axis 309. Premix barrel cap 324 may form an air pocket or channel with barrel end 332.

Premix tube outer surface 339 may include the radially inner cylindrical surfaces of barrel 331 and barrel end 332. When installed in injector head 320, premix tube outer surface 339 may be located radially outward from premix tube inner surface 365.

Figure 7:
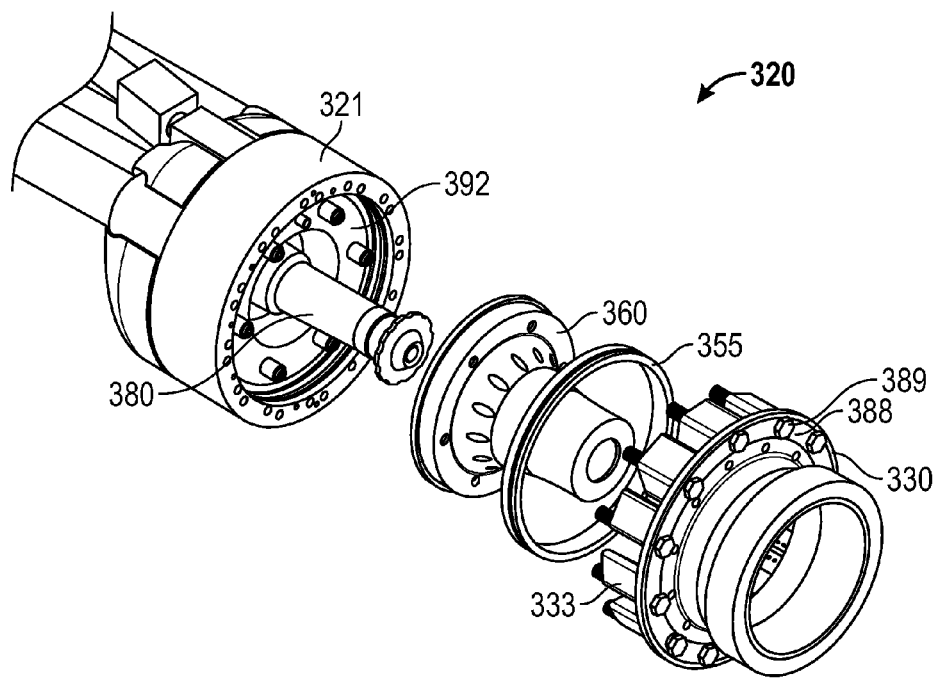
FIG. 7 is an exploded view of the injector head of FIG. 3.

FIG. 7 is an exploded view of the injector head 320 of FIG. 3. Referring to FIGS. 3 and 7, outer premix barrel 330 may be secured to body assembly 321 with bolts 389 and lock plates 388. Inner premix tube 360 may be secured to body assembly 321 by retaining ring 355. In some embodiments, retaining ring 355 is screwed on to body assembly 321.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 390 via injector 310 and combusted. Energy is extracted from the combustion reaction via the turbine 400 by each stage of the series of turbine disk assemblies 420. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

Referring to FIGS. 4-6, during liquid fuel operation of gas turbine engine 100, fuel enters first end 345 of liquid gallery scroll 343 from liquid inlet tube 354. Fuel is directed along liquid gallery scroll 343 from first end 345 to second end 346 with a portion of the fuel being directed through each atomizer inlet 344. As the fuel passes through liquid gallery scroll 343 the fuel may increase in temperature. This increase in temperature may be caused by heat transfer between the fuel and liquid gallery assembly 340. Fuel heated above certain temperatures may cause the fuel to coke within liquid gallery scroll 343. For example, temperatures above 204 degrees Celsius (400 degrees Fahrenheit) may cause coking in some liquid fuels.

Tapering liquid gallery scroll 343 may increase the velocity of the fuel through liquid gallery scroll 343, which may reduce the residence time of the fuel in liquid gallery scroll 343. Reducing the residence time of the fuel may result in lower fuel temperatures.

Liquid gallery scroll 343 may be configured to maintain the fuel flow rate within turbulent flow ranges within liquid gallery scroll 343. In one embodiment, the fuel flow rate is at least 2.4 meters/second (8 feet/second) on a nominal day at 15.5 degrees Celsius (60 degrees Fahrenheit). In another embodiment, the fuel flow rate is between 2.4 meters/second (8 feet/second) and 3.4 meters/second (11 feet/second) on a nominal day at 15.5 degrees Celsius (60 degrees Fahrenheit). In yet another embodiment, the fuel flow rate is between 2.4 meters/second (6 feet/second) and 3.4 meters/second (13.5 feet/second) for the ambient operating range of gas turbine engine 100 between −40 degrees Celsius (−40 degrees Fahrenheit) and 49 degrees Celsius (120 degrees Fahrenheit). Liquid gallery scroll 343 may also be configured to maintain the Reynolds number within turbulent flow ranges within liquid gallery scroll 343. In one embodiment the Reynolds number is at least 2000. In another embodiment, the Reynolds number is between 2000 and 6230.

Maintaining the fuel flow within turbulent flow ranges through liquid gallery scroll 343 may increase the heat transfer coefficient, and may reduce the maximum temperature of the fuel and the maximum wall temperature of liquid gallery scroll 343. These temperature reductions may prevent or reduce the fuel coking within liquid gallery scroll 343. In some embodiments, the fuel temperatures within the liquid gallery scroll 343 are maintained below 204 degrees Celsius (400 degrees Fahrenheit). In other embodiments, the fuel temperatures within the liquid gallery scroll 343 are maintained below 177 degrees Celsius (350 degrees Fahrenheit).

During the lifetime of an injector 310, it may be overhauled. Components of injector head 320 including outer premix barrel 330, inner premix tube 360, and liquid gallery assembly 340 may need to be repaired or replaced. Referring to FIG. 7, outer premix barrel 330, including vanes 333, is removed from injector head 320 by removing bolts 389. Inner premix tube 360 is removed after removing outer premix barrel 330 by removing retaining ring 355. Removing outer premix barrel 330 and inner premix tube 360 provides access to liquid gallery assembly 340, allowing the repair or replacement of liquid gallery assembly 340. Flow shield 392 may also need to be removed to access liquid gallery assembly 340.

Referring to FIG. 3, liquid gallery assembly 340 may be welded or brazed to injector body 322. In embodiments, collar 353 is brazed into collar counterbore 328. Liquid gallery assembly 340 is removed from injector head 320 by machining out the portions of liquid gallery assembly 340 welded or brazed to injector body 322. Providing a removable outer premix barrel with vanes 333, a removable inner premix tube 360, and access to liquid gallery assembly 340 may reduce overhaul costs and may increase the life of injectors 310.

During operation of gas turbine engine 100 barrel end 332 of outer premix barrel 330 and tip end 363 of inner premix tube 360 are adjacent combustion chamber 390 and exposed to high temperatures. Barrel end 332 and tip end 363 may need to be replaced sooner than other portions of outer premix barrel 330 and inner premix tube 360. Replacing barrel end 332 or tip end 363 may reduce repair and overhaul costs of injectors 310.

Figure 8:
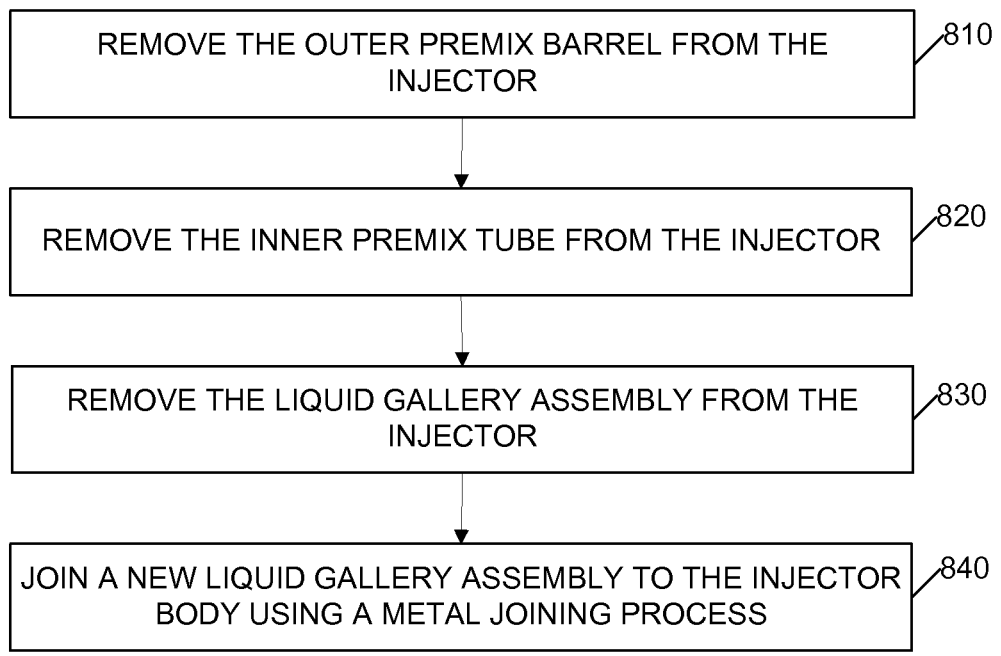
FIG. 8 is a flowchart of a method for overhauling the injector of FIG. 2.

FIG. 8 is a flowchart of a method for overhauling an injector 310. The method includes removing outer premix barrel 330 from the injector 310 at step 810. Step 810 includes removing bolts 389 that secure outer premix barrel 330 to injector body 322. Step 810 is followed by removing inner premix tube 360 from injector 310 at step 820. Step 820 includes removing retaining ring 355. Removing retaining ring 355 may include unscrewing retaining ring 355 from injector body 322.

Step 820 is followed by removing liquid gallery assembly 340 from injector 310 at step 830. Removing liquid gallery assembly 340 includes machining out the portions of liquid gallery assembly 340 joined by a metal joining process to injector body 322; this may include machining out collar 353. Step 830 is followed by joining a new liquid gallery assembly 340 to injector body 322 using a metal joining process at step 840. In one embodiment, brazing is the metal joining process used. Joining a new liquid gallery assembly 340 to injector body 322 may include joining a new collar 353 to injector body 322 at collar counterbore 328.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular liquid gallery, it will be appreciated that the liquid gallery in accordance with this disclosure can be implemented in various other configurations, can be used with various other types of gas turbine engines and liquid gallery assemblies, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A liquid gallery assembly for a fuel injector of a gas turbine engine, comprising:
   a gallery body;
   a liquid gallery scroll extending into the gallery body spanning from a first end to a second end in a circumferential direction, the liquid gallery scroll including a taper with a cross-sectional area of the liquid gallery scroll reducing from the first end to the second end;
   a plurality of atomizer inlets, each atomizer inlet being in flow communication with the liquid gallery scroll;
   a plurality of atomizer bosses extending from the gallery body, each atomizer boss being aligned with one of the plurality of atomizer inlets; and a gallery cover with a hollow cylinder shape including a C shaped cross-section configured to fit over a portion of an outer circumferential surface of the gallery body and a portion of an inner circumferential surface of the gallery body, with a mating surface of the gallery body contacting an internal surface of the hollow cylinder shape, the gallery cover including
a liquid inlet tube boss extending from the hollow cylinder shape in an axial direction of an axis of the liquid gallery assembly, the liquid inlet tube boss being aligned with the first end of the liquid gallery scroll.

2. The liquid gallery of claim 1, wherein the liquid gallery scroll includes a constant taper from the first end to the second end.

3. The liquid gallery of claim 1, wherein the liquid gallery scroll includes a plurality of tapered sections.

4. The liquid gallery of claim 1, wherein the liquid gallery scroll is tapered to maintain a flow rate of a fuel passing through the liquid gallery scroll within turbulent flow ranges from the first end to the second end.

5. The liquid gallery of claim 1, wherein the gallery body includes a hollow cylinder shape.

6. The liquid gallery of claim 5, wherein the liquid gallery scroll spans between ninety and ninety five percent of the circumference of the gallery body.

7. The liquid gallery of claim 1, wherein a depth of the liquid gallery scroll decreases from the first end to the second end.

8. The liquid gallery of claim 5, wherein a heat transfer reduction slot extends circumferentially about a portion of the hollow cylinder shape, the heat transfer reduction slot starting adjacent the second end and ending adjacent the first end.

9. A fuel injector for a gas turbine engine, the fuel injector further comprising:
the liquid gallery of claim 1;
an outer premix barrel including
a body portion,
a barrel portion extending from the body portion, and
a plurality of vanes extending from the body portion in a direction opposite the barrel portion;
an inner premix tube located radially inward from the outer premix barrel, the inner premix tube including
a retaining lip; and
a retaining ring located adjacent the retaining lip and configured to secure the inner premix tube to an injector body of the fuel injector.

10. A liquid gallery assembly for a fuel injector of a gas turbine engine, comprising:
a liquid gallery including
a gallery body with an annular ring shape, the gallery body configured to include
a liquid gallery scroll extending from a first end to a second end about a portion of the annular ring shape in a circumferential direction, the liquid gallery scroll including a cross-sectional area sized and configured to maintain a Reynolds number of a fuel passing through the liquid gallery scroll within turbulent flow ranges from the first end to the second end, and
a heat transfer reduction slot extends circumferentially about a second portion of the annular ring shape, the heat transfer reduction slot starting adjacent the second end and ending adjacent the first end,
a plurality of atomizer inlets, each atomizer inlet being in flow communication with the liquid gallery scroll, and
a plurality of atomizer bosses extending from the gallery body, each atomizer boss being aligned with one of the plurality of atomizer inlets.

11. The liquid gallery assembly of claim 10, wherein a depth of the liquid gallery scroll decreases from the first end to the second end.

12. The liquid gallery assembly of claim 10, wherein the Reynolds number of the fuel passing through the liquid gallery scroll is at least 2000.

13. The liquid gallery assembly of claim 10, further comprising:
a gallery cover with a second annular ring shape including a C shaped cross-section configured to fit over a portion of an outer circumferential surface of the gallery body and a portion of an inner circumferential surface of the gallery body, with a mating surface of the gallery body contacting an internal surface of the second annular ring shape, the gallery cover including
a liquid inlet tube boss extending from the second annular ring shape in an axial direction of an axis of the liquid gallery assembly, the liquid inlet tube boss being radially and circumferentially aligned with the first end of the liquid gallery scroll; and
a plurality of atomizers, each of the plurality of atomizers being located within an atomizer boss, extending from the atomizer boss, and being in flow communication with one of the plurality of atomizer inlets.

14. A gas turbine engine, comprising:
an injector including
the liquid gallery assembly of claim 10;
an injector body, wherein the liquid gallery assembly is located within the injector body,
an inner premix tube axially adjacent the liquid gallery, the inner premix tube being secured to the injector body by a retaining ring, and
an outer premix barrel axially adjacent the injector body and radially outward from the inner premix tube, the outer premix barrel including a body portion, a barrel portion extending from the body portion, and a plurality of vanes extending from the body portion in a direction opposite the barrel portion.

\* \* \* \* \*